July 3, 1951            J. C. LYON            2,559,127

ADJUSTABLE FOOT AND LEG REST FOR CAR SEATS

Filed Nov. 27, 1945            3 Sheets-Sheet 1

INVENTOR
John C. Lyon
ATTORNEY

July 3, 1951 J. C. LYON 2,559,127
ADJUSTABLE FOOT AND LEG REST FOR CAR SEATS
Filed Nov. 27, 1945 3 Sheets-Sheet 2

INVENTOR
John C. Lyon
BY
Donald B Waite
ATTORNEY

July 3, 1951
J. C. LYON
2,559,127
ADJUSTABLE FOOT AND LEG REST FOR CAR SEATS
Filed Nov. 27, 1945
3 Sheets-Sheet 3
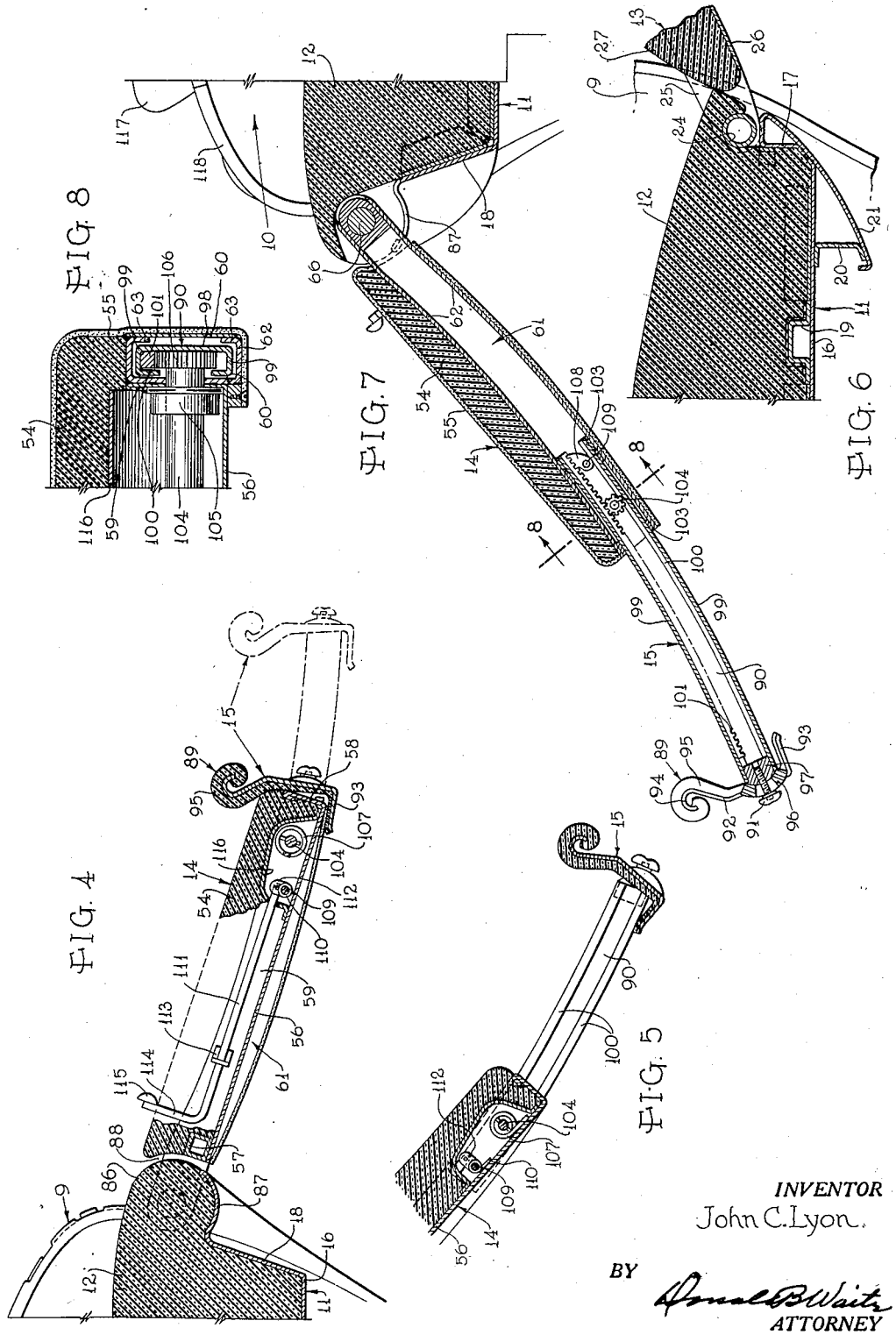
INVENTOR
John C. Lyon
BY
Donald B Waite
ATTORNEY Patented July 3, 1951

2,559,127

UNITED STATES PATENT OFFICE 2,559,127

ADJUSTABLE FOOT AND LEG REST FOR CAR SEATS

John C. Lyon, Upper Darby, Pa., assignor, by mesne assignments, to Heywood-Wakefield Company, Gardner, Mass., a corporation of Massachusetts Application November 27, 1945, Serial No. 631,124

4 Claims. (Cl. 155—171)

The invention relates to reclining seats and more particularly to seats for railway cars or other vehicles.

The invention is outstandingly concerned with improvements in the operating mechanisms for the leg rest and the foot rest for a seat of the type used in vehicles, especially in railway cars.

Among the objects of the invention are to provide mechanisms of the indicated type which are easy to operate, are of simple construction and are so rugged and durable as to withstand the many years of use to which seats for railway cars and other vehicles are subjected.

Among the more specific objects of the invention is the provision of an operating mechanism for the foot rest which is of such compact construction as to be housed in the interior of the leg rest and which likewise can be adjusted and operated by the seat occupant in many different positions with ease and without requiring the occupant to leave the seat.

Further objects and advantages, as well as the features of the invention and the details thereof, will become apparent from the embodiment illustrated in the attached drawing and described in the following:

In the drawing,

Figures 4 through 7 are fragmentary sections taken along the correspondingly numbered lines of Figure 1; and Figure 8 is a fragmentary section taken along line 8—8 of Figure 7.

The structures for supporting the seats on the floor and for revolving the seat are not shown and described in detail because they form the subject matter of the inventor's simultaneous application "Revolving Seat, Especially for Railway Cars."

Figure 1:
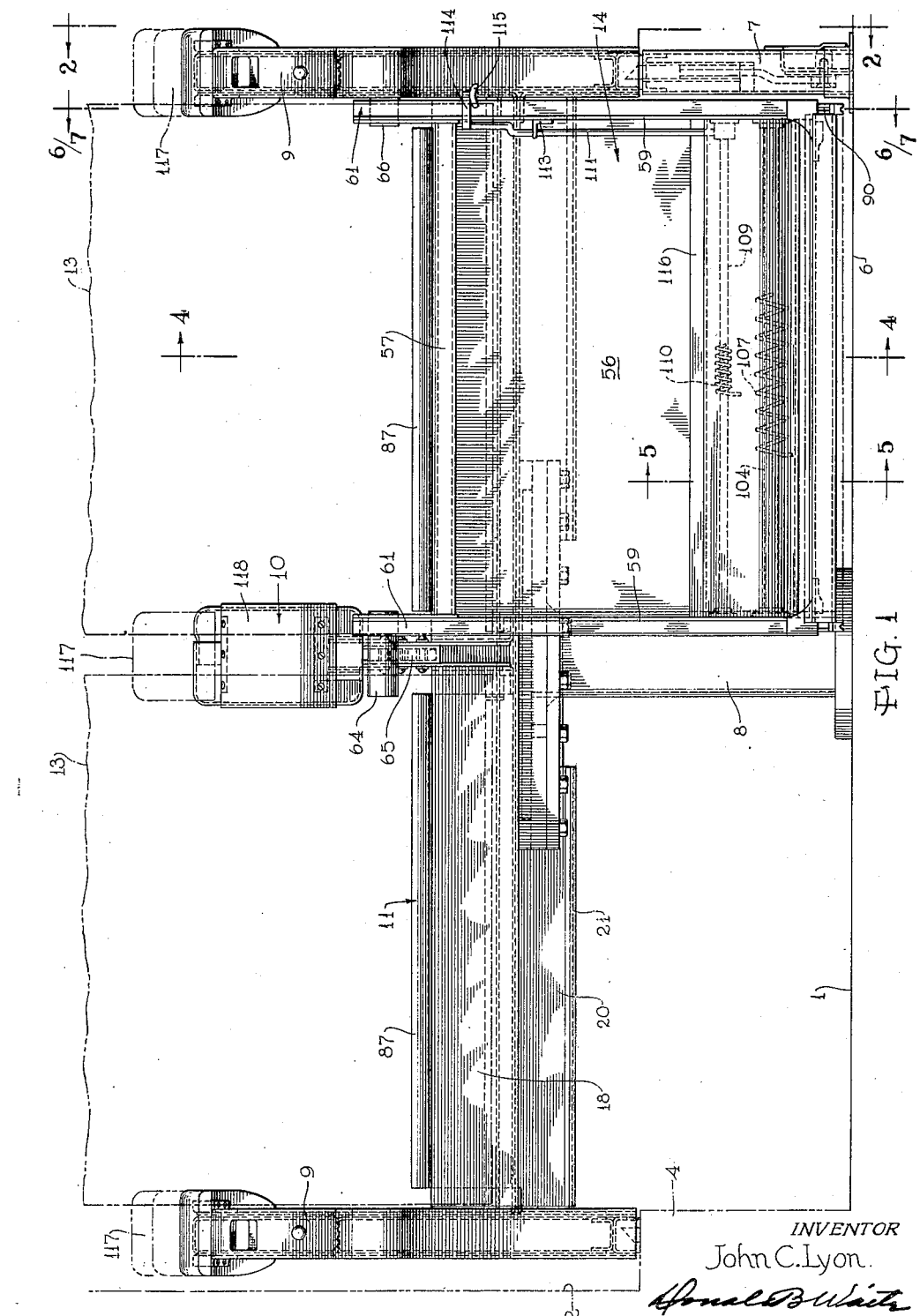
Figure 1 is a fragmentary front elevation of two combined seats with the seat cushions removed and the leg rest cushion of the one seat removed, whereas the entire leg rest of the other seat is removed so as to show the construction therebehind.

Figure 1 shows fragmentary parts of the floor 1 and one side wall 2 of a railway car. Mounted partly on the floor and partly on the projecting portion of heater duct 4 along the side wall is a pair of seats, Figure 1. Two rows of such double seats may be arranged along the opposite side walls of a railway car or other vehicle, leaving an aisle between them.

Each pair of seats comprises the following main elements: Two stationary floor supports 7 and 8 in addition to the support afforded by heater duct 4, end supporting arm rest structures 9, a separating arm rest structure 10, a supporting structure 11 for the seat cushions 12, a pair of back rests 13, and a pair of leg rests 14 each with a foot rest 15.

The structure 11 which is in the general form of a trough with a bottom wall 16, a back wall 17 and a front wall 18 extends between and is structurally connected to the end walls 9 and supports and is likewise structurally connected to the intermediate arm rest 10. 19 and 20 are reinforcements welded to the bottom wall 16 of the seat support 11. A panel 21 curved in cross section, which may form one piece with the rear wall 17, is secured, as by welding, to the bottom wall 16 and to the lower margin of the reinforcing rail 20. This panel 21 constitutes together with the members 17 and 20 and the bottom wall 16 two closed box sectional structures which contribute to the strength of the seat support 11. The members 19, 20 and 21 are likewise secured to the end structures 9 and also to the intermediate arm rest 10.

The leg rest 14 comprises a cushion 54 covered with a fabric covering 55 and a supporting structure for the cushion. This supporting structure has a main bottom panel 56 secured at its upper margin to a tubular transverse member 57 and reinforced along its bottom margin by an upstanding flange 58. Along each side, the panel 56 is likewise provided with an upstanding flange 59 which is secured, as by welding, to the upstanding web or bottom wall 60 of a channel section member 61 having outwardly directed side walls 62 and inturned flanges 63.

The members 61 extend beyond the inner or upper margin of the panel 56 and beyond the member 57 to the ends of which they are secured, see right side of Figure 1. The members 61 adjacent the middle arm rest 10 are rotatably supported on the ends of the short shaft 64 forming part of a bracket 65 secured to the structure 10. The upper ends of the outer arms 61 are keyed to a stub shaft 66 which is rotatably supported in bearings 67 of the end structure 9 and is provided with two cylindrical portions 68 separated from each other by a groove 69. The portions 68 are each provided with a number of recesses 70 in such manner that the recesses of the one member 68 are circumferentially offset with respect to the recesses of the other member 68.

A link 71 has its one end extended into the groove 69 and journalled to the portions 68 by a pin 72 and its other end journalled at 73 to a shoe 74 and a second link 75, which latter is journalled at 76 to the frame member 32. The shoe 74 supports one end of a compression spring 77, the other end of which rests against the member 78 which is turn presses against a bracket 79 secured to the frame member 33. The shoe 74 is connected with a tubular shaft 80 which extends through the spring 77 which is shown broken away centrally, and is slidingly surrounded by the shoe 78 and the bracket 79 so as to hold the shoe 78 and the spring 77 in proper alignment. The arrangement of the members 71 to 79 is such that the spring endeavors to turn the members 68 with the shaft 66 and thereby to swing the entire leg rest 14 into its raised position.

Figures 2, 3:
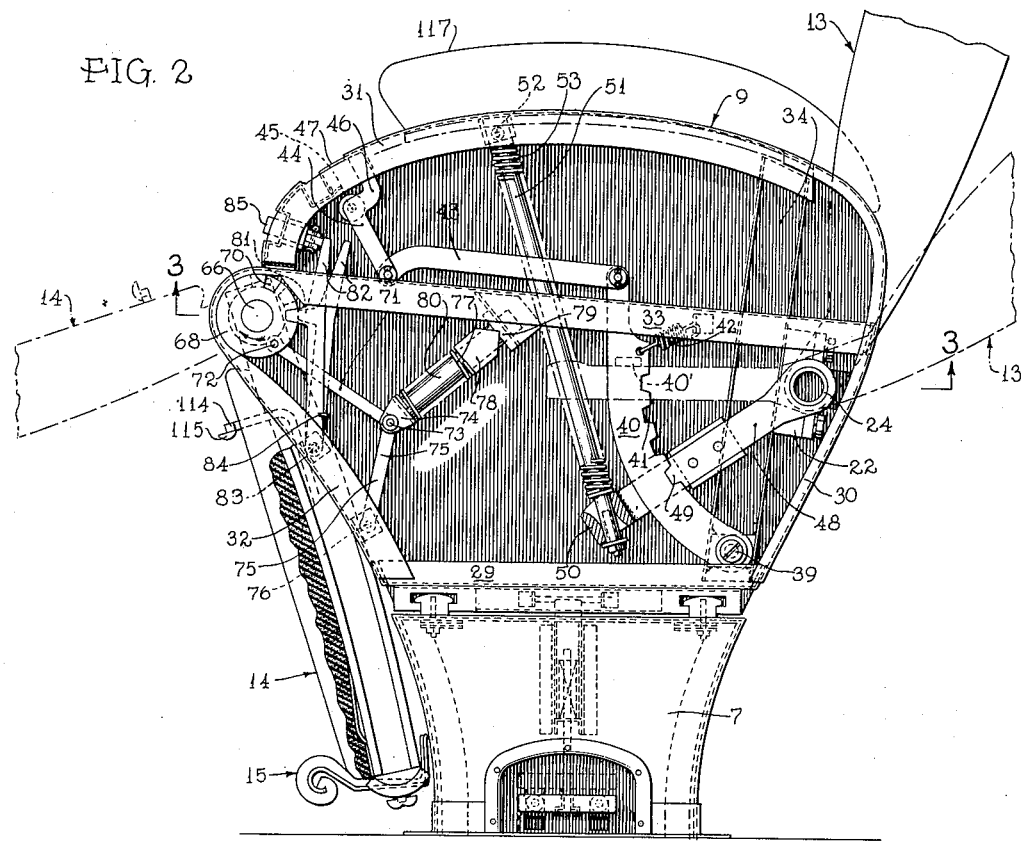
Figure 2 is a side elevation partly in section viewed in the direction of the arrows and the section taken along line 2—2 of Figure 1.
Figure 3 is a horizontal fragmentary section taken along line 3—3 of Figure 2.

For holding the foot rest 14 in the desired elevation, one of the recesses 70 on the members 68 is engaged by the tooth 81 of one of the two levers 82. The levers 82 are journalled side-by-side to the frame member 32 at 83 and are pressed toward the members 68 by a spring or springs 84, one end of which is visible in Figure 2. A spring biased button 85 is guided in the frame member 31 just below the previously described finger grip 47 and, when pushed inward against the spring pressure, pushes the upper ends of both levers 82 inwardly and thereby holds the teeth 81 out of engagement with the members 68 and their recesses 70. The provision of the two members 68, of the two rows of recesses 70 and of the two levers 81 with one tooth each allows a greater number of adjustments than could be obtained with only one of these members. Note that only one of the teeth 81 engages at a time one of the recesses 70 while the other tooth rests between or adjacent the recesses 70 against its member 68.

For adjusting the elevation of the leg rest, an occupant has merely to push the button 85 inwardly and then, if he wants the leg rest raised, to lift his legs to the desired position, whereupon the leg rest will follow the legs under the influence of the spring 77 and the lever system 71 to 76, or, when lowering of the leg rest is desired, he has, after pushing the button 85 inwardly, to press his legs downwardly so as to overcome the resistance of the spring 77.

The front edge of the seat cushion 12 has a cylindrical portion 86 (Figure 4) arranged concentrically to the axis of the leg rest support shafts 64 and 66 and on its underside it is supported by an extension 87 of the front wall 18 of the cushion supporting structure 11. This extension 87 is likewise curved in cross section concentrically to the axis of the leg rest attachment. The underside of the cylindrical portion 86 is recessed adjacent and the supporting portion 87 ends short of the structures 9 and 10 so as to make room for the upper ends of rails 61 of the leg rest, as clearly shown in Figures 1 and 7. The leg rest cushion 54 has its upper margin concavely shaped concentrically to the leg rest supporting axis, leaving merely a narrow space 88 between it and the aforesaid cylindrical portions 86, 87. This arrangement provides for a front edge of the seat cushion of sufficient softness while on the other hand a narrow space only is left between the front edge of the seat cushion and the leg rest which is essentially for the comfort of the occupant.

The foot rest 15 comprises as its main elements a transverse member 89 and two lateral rails 90 which have their outer ends secured to the rail 89 by screw bolts 91. The cross member 89 may have a main web portion 92 and lower arm or flange 93 directed toward the side and an upwardly cylindrically rolled-in portion 94. This structure 92 to 94 is covered by a member 95 of soft rubber or a similar material giving a good hold for the feet of the occupant. The connection between the members 89 and 90 comprises shoes or brackets 96, 97, respectively, connected to one of the two members and provided with corresponding cylindrical surfaces. The bolt 91 is screw threaded into the member 97 and passes through an elongated slot of the member 96. This arrangement permits the angular adjustment of the member 89 with respect to the rails 90 about a transverse axis.

The rails 90 each consist of an inwardly facing channel with a bottom wall 98, side walls or web 99 and inturned flanges 100. Secured to the upper one of the side walls 99 is a tooth rack 101 which may extend over the entire length of the respective member 90. The member 90 is slidably guided in the side rails 61 of the leg rest by means of wear plates 102, 103, respectively secured to the outside of the rail 90 and the inside of the rail 61. These plates serve simultaneously for limiting the outward movement of the rails 90. The rails 90 and 91 are curved in side view, as clearly shown in several of the figures. This is for the purpose of elevating the foot rest member 89 above the surface of the leg rest cushion 43 when the foot rest is in its outwardly projected position, whereas when the foot rest is retracted, it projects a small distance only above the leg rest, as shown in Figure 4.

The operating mechanism for the foot rest is supported entirely by the leg rest with the exception of the aforementioned rack 101. A transverse shaft 104 supported in bearings 105 secured to the side walls 55 of the panel 56 of the leg rest, carries on each of its ends a pinion 106 which in turn meshes with the respective tooth rack 101. A torsion spring 107 surrounding the shaft 104 has one of its ends in engagement with said shaft and the other end in engagement with the supporting structure of the leg rest, such as with the member 56. This spring is so arranged and adjusted that it will retract the foot rest by means of the shaft 104, the pinions 106 and the racks 101 to the innermost position unless prevented from doing so.

For holding the foot rest in any desired position of outward extension, each of the racks 101 is also engaged by a pawl 108. These pawls are supported by and firmly connected with the ends of a transverse shaft 109 which is likewise rotatably supported in the structure 56 and are held in the engaging position by a torsion spring 110. An operating rod 111 is journalled to a projecting arm 112 of the shaft 109 and slidably engaged in a bracket 113 of the structure 56. The other end of the rod 111 is provided with a cross piece 114 ending in an operating handle 115 and extending outwardly through a space (not shown) left between the top of the respective side rail 61 and the marginal portion of the leg rest cushion 54.

The shafts 104, 109, the torsion springs 107, 110, the bearings 105, the lever 112 and the adjoining end of the rod 111 are covered by a transverse channel section member 116 which is secured mouth-down to the panel 56. This member 116 not only supports the seat cushion 54 spaced from the aforesaid parts of the operating mechanism for the foot rest but also constitutes at the same time a reinforcement for the supporting structure of the leg rest.

For adjustment of the foot rest, the occupant has to pull the handle or finger grip 115 thereby disengaging the pawls 108, whereupon he may either push the leg rest outwardly by pressing his feet against the cross member 89 or he may allow the foot rest to move inwardly under the action of the spring 107 by withdrawing his feet. Upon release of the handle 115, the rack 101 will be reengaged by the pawls 108 and thereby the foot rest stopped in the new position.

Minor details of the structure, most of which are customary in seats of this type, have not been described in detail, but will, of course, be supplied, such as for instance, the upholstered, removable, top members 117 secured to the arm rest structures 9 and 10 and the fabric covering for the different cushions, which latter may consist of sponge rubber moldings, and the widened portion 118 of the front of the middle arm rest housing the tuning devices (not shown) for the individual broadcast reception devices.

While one embodiment of the invention is shown and described in detail, obviously many modifications are conceivable without departing from the invention as covered by the attached claims.

What is claimed is:

1. In a seat especially for railway cars and other vehicles, comprising a seat structure, a leg rest attached to the front margin of said structure swingably about a substantially horizontal axis, a foot rest provided with lateral arms slidably guided in said leg rest for inward and outward movement, a tooth rack secured to at least one of said arms, a pinion engaging said tooth rack and rotatably supported in said leg rest, a spring means between said leg rest and said pinion endeavoring to rotate the pinion so as to push the foot rest inwardly, a releasable stopping means for holding said foot rest in different desired positions against the action of the spring and against pressure exerted on the foot rest by the feet of an occupant.

2. In a seat especially for railway cars and the like, comprising a leg rest and a foot rest, a pair of arms on said foot rest slidably guided on the said leg rest for inward and outward movement, a tooth rack on each of said arms, a pinion for each of said racks and in driving engagement therewith, a common shaft carrying on its ends said pinions and rotatably supported with the latter in the leg rest, a coil spring surrounding said shaft and engaging same with one of its ends whereas its other end engages a portion of said leg rest, said coil spring being stressed in torsion so as to push the foot rest inwardly by means of said shaft, said pinions and said tooth racks, releasable stopping means between said leg rest and said foot rest for holding the latter in any position of adjustment against the action of the spring and against the pressure exerted by an occupant on the foot rest.

3. In a vehicle seat according to claim 1, said stopping means engaging said tooth rack.

4. In a vehicle seat according to claim 2, said stopping means comprising a shaft spaced from and parallelly arranged to said shaft carrying the pinions, said second shaft carrying means on its ends engaging said tooth racks.

JOHN C. LYON.

REFERENCES CITED

The following references are of record in the file of this patent:

UNITED STATES PATENTS

| Number | Name | Date |
|---|---|---|
| 134,733 | Collins | Jan. 14, 1873 |
| 156,772 | Collins | Nov. 10, 1874 |
| 196,506 | Vose | Oct. 23, 1877 |
| 205,070 | Fernquist | June 18, 1878 |
| 513,169 | Armstrong | Jan. 23, 1894 |
| 920,854 | Flindall | May 4, 1909 |
| 945,928 | Fowler | Jan. 11, 1910 |
| 988,600 | Simpson | Apr. 4, 1911 |
| 1,047,462 | Taylor | Dec. 13, 1912 |
| 1,224,982 | Washeim | May 8, 1917 |
| 1,334,771 | McClary | Mar. 23, 1920 |
| 2,217,352 | Todd | Oct. 8, 1940 |

FOREIGN PATENTS

| Number | Country | Date |
|---|---|---|
| 73,749 | Germany | Mar. 10, 1894 |